United States Patent

Piper

[15] 3,665,752
[45] May 30, 1972

[54] VIBRATION DENSITY METER COMPRISING NODAL CIRCLE SUPPORTED RESONANT DISK

[72] Inventor: Thomas C. Piper, Idaho Falls, Idaho

[73] Assignee: The United States of America as represented by the United States Atomic Energy Commission

[22] Filed: June 9, 1970

[21] Appl. No.: 44,833

[52] U.S. Cl. ............................................. 73/32, 73/194 B
[51] Int. Cl. ............................................. G01n 9/00
[58] Field of Search ........................... 73/32, 67.2, 30, 194 B

[56] References Cited

UNITED STATES PATENTS

| | | |
|---|---|---|
| 2,486,984 | 11/1949 | Rowe ........................................ 73/67.2 |
| 3,420,092 | 1/1969 | Darsch ...................................... 73/32 |
| 2,178,252 | 10/1939 | Forster ..................................... 73/67.2 |
| 1,543,124 | 6/1925 | Ricker ...................................... 73/67.2 X |

OTHER PUBLICATIONS

McMaster, Non Destructive Testing Handbook, Vol. 2, pp. 51–56, 51–57, 1959.

Primary Examiner—Richard C. Queisser
Assistant Examiner—C. E. Snee
Attorney—Roland A. Anderson

[57] ABSTRACT

A disk supported only at the nodal circle of its simplest mode of vibration is driven at a resonant frequency by a magnetic force. The disk may be placed in a fluid and the density of the fluid can be determined by measuring the resonant frequency of the disk.

1 Claim, 5 Drawing Figures

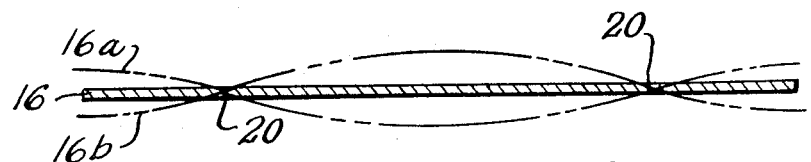
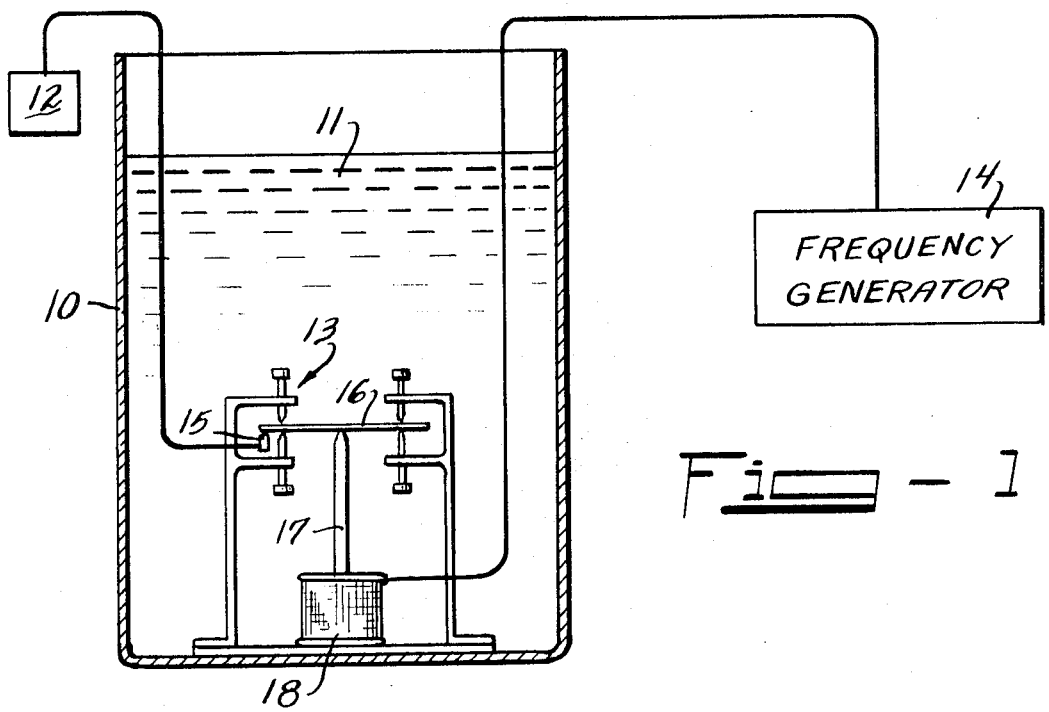
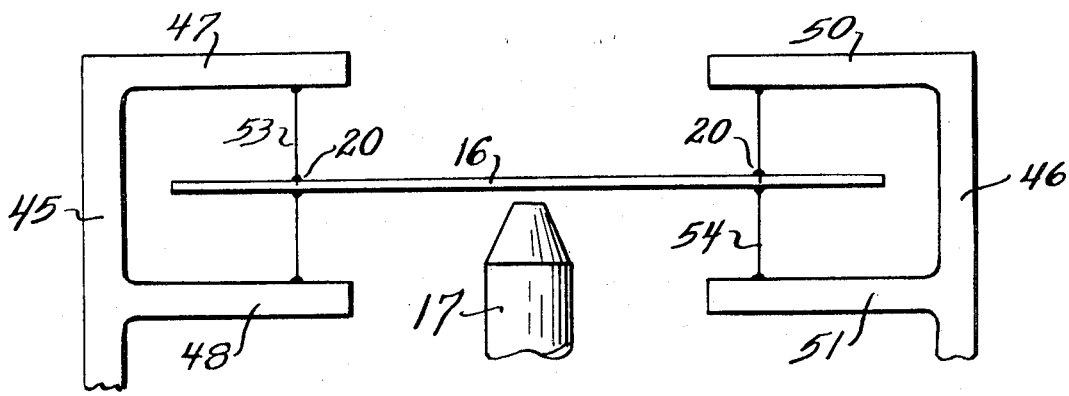

Patented May 30, 1972

Inventor
Thomas C. Piper
Attorney

VIBRATION DENSITY METER COMPRISING NODAL CIRCLE SUPPORTED RESONANT DISK

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

In many processes it is important to know the density of fluids which are being used. The simplest way of determining the density is to measure the weight of a known volume of the fluid. However, where the fluid cannot be readily sampled and its density is constantly changing, a different measurement system must be used. In order to measure the density of a fluid under flow conditions, a method has been developed which uses a change in the resonant frequency of a mechanically vibrating device to determine the density. Several different systems have been developed on this principle, but the measurement devices have been relatively complex and difficult to build. The devices have not been rugged enough to withstand certain environments, particularly the high-temperature environments associated with the fluids used in nuclear reactors. These devices have been temperature-sensitive so that errors occur in measurement of the density of fluids where the fluid temperature undergoes changes.

It is therefore an object of this invention to provide an improved device for measuring the density of a fluid under flow conditions.

Another object of this invention is to provide a mechanically vibrating device which is temperature-insensitive.

Another object of this invention is to provide a mechanically vibrating device of simple construction which can be used in the environment of a nuclear reactor.

SUMMARY OF THE INVENTION

In practicing this invention, a mechanically vibrating device is provided consisting of a disk supported at the nodal circle of its simplest mode of vibration. The disk is magnetically driven at its center. The disk can be placed in a fluid and the resonant frequency of the disk immersed in the fluid measured. The resonant frequency of the disk is a function of the density of the fluid in which it is immersed; thus, by knowing the resonant frequency of the disk, the density of the fluid can be calculated. By constructing the disk of material having a low temperature coefficient, the disk can be made relatively insensitive to temperature changes. The entire structure including the driving means can be constructed to operate in a high-temperature environment

DETAILED DESCRIPTION OF THE DRAWINGS

The invention is illustrated in the drawings, of which:

FIG. 1 shows the mechanical vibrating device immersed in a fluid to measure the density of the fluid;

FIG. 2 illustrates the simplest mode of vibration of a thin disk;

FIG. 5 illustrates a second embodiment of a mounting structure for the disk.

DETAILED DESCRIPTION OF THE INVENTION

Figure 3:
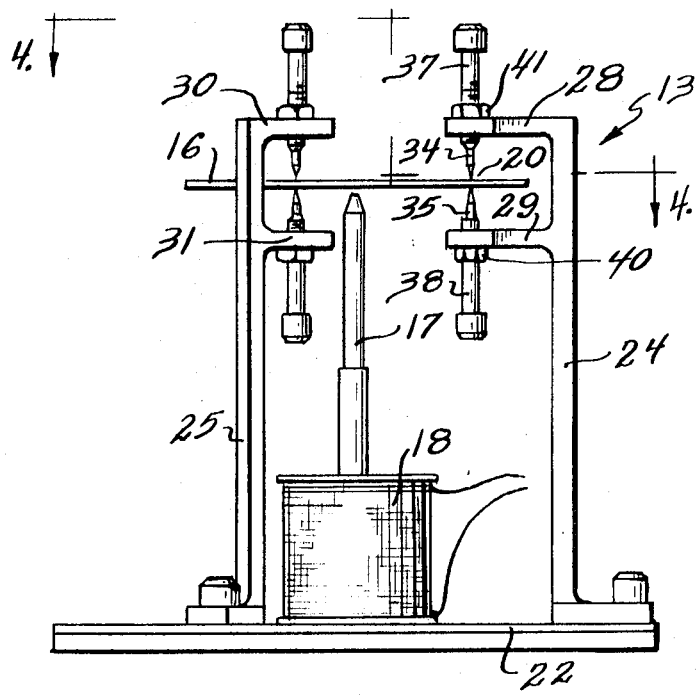
FIGS. 3 and 4 illustrate the mounting structure for the disk.

Referring to FIG. 1, there is shown a mechanical vibrating device 13 immersed in a fluid 11 which is held in a container 10. The mechanical vibrating device includes a thin disk 16 which can be made to vibrate by means of a changing magnetic fluid applied to the disk center by rod 17 and coil 18. Frequency generator 14 applies an alternating current signal to a coil 18 to provide the changing magnetic field.

In order to measure the density of the fluid, the frequency of the electric current supplied to coil 18 from frequency generator 14 is changed until the vibration of disk 16 is resonant at its simplest mode of vibration. The frequency of vibration of disk 16 in the unknown fluid is substituted in the formula below to obtain the fluid density $$\rho_2 = \rho_1 \left[(f_0/f_2)^2 - 1\right] / \left[(f_0/f_1)^2 - 1\right]$$

where
 $\rho_1$ is the known density of a reference fluid,
 $\rho_2$ is the unknown density of the fluid being measured,
 $f_0$ is the natural frequency of oscillation of disk 16 (the resonant frequency in a vacuum),
 $f_1$ is the frequency of oscillation of the disk immersed in a reference fluid, and
 $f_2$ is the frequency of vibration of the disk immersed in a fluid of unknown density.

An eddy current coil 15 is placed near the edge of disk 16 and is responsive to the deflection of disk 16 to develop eddy currents which are measured by known circuits 12. When disk 16 vibrates at resonance the magnitude of the deflection of the disk is very large compared to the deflection of the disk at frequencies off resonance. The large deflection causes the magnitude of the eddy currents to increase so that frequency at which resonance occurs can be determined. A system which can be used to detect resonance in this manner is described in an article: Reflected Impedance of a Circular Coil in the Proximity of a Semi-infinite Medium; David H S. Cheng; IEEE Transactions on Instrumentation and Measurement; Vol. IM—14, No. 3, Sept. 1965, p. 107.

Referring to FIG. 2, where is illustrated a cross-sectional view of disk 16 showing the motion of the disk when it vibrates in its simplest mode of vibration. The disk vibrates from position 16a to position 16b through position 16 and has nodes at 20. This vibration is of the form where the center portion of the disk moves one way while the outer portion moves the other way. The nodal circle 20 is at a radius of approximately 0.68 of the radius of the disk. In the structure of this invention, disk 16 is supported at the nodal circle in order that the disk may vibrate freely at its simplest mode of vibration without interference from the disk supporting structure.

Figure 4:
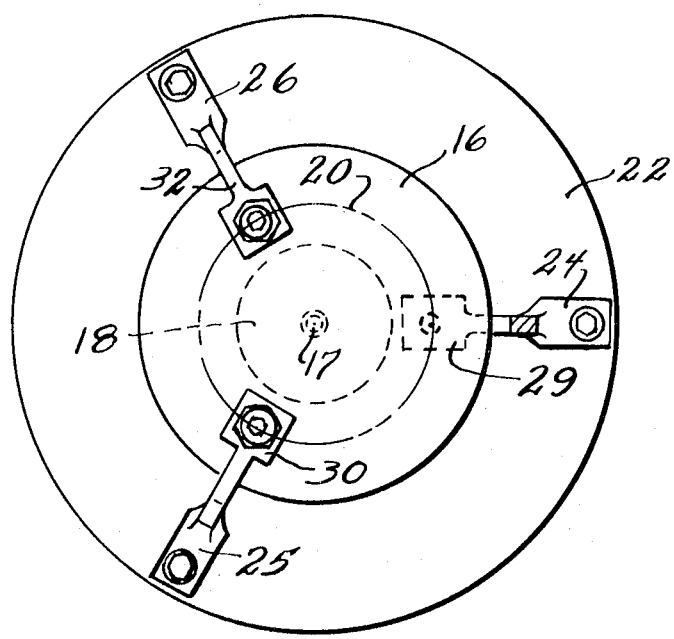

Referring to FIGS. 3 and 4, there is shown the mounting structure for disk 16. Three support rods 24, 25 and 26 are mounted on a base 22 and disposed around the disk. Each of the support rods has an arm 28, 30 and 32 which extends over disk 16 and above it. Corresponding arms 29 and 31 connected to the support rods 24 and 25 extend from the support rods under disk 16. Support rod 26 also has a support arm extending therefrom underneath disk 16 which is not shown in the drawings.

Each of the support arms has pointed rods extending toward the disk, as illustrated by the rods 34 and 35 extending from support arms 28 and 29. The points on rods 34 and 35 are positioned opposite each other and are at a distance from the support rod 24 so as to contact disk 16 at the nodal circle. A screw adjustment 37 and 38 together with locking nuts 40 and 41 permit the pointed rods 34 and 35 to be properly adjusted to support disk 16. The pointed rods extending from each of the other support arms are similar in construction to the pointed rods 34 and 35 and are constructed so as to contact disk 16 at the nodal circle. Thus, disk 16 is securely clamped at its nodal circle in a manner so that it is free to vibrate in its simplest mode of vibration.

A rod 17 of magnetic material extends from the support structure 22 to the center of disk 16. A slight spacing is maintained between disk 16 and rod 17 to permit disk 16 to vibrate without touching rod 17. A coil 18 surrounding a portion of rod 17 provides a magnetic driving force when suitably energized.

Referring to FIG. 5, there is shown a second embodiment of a structure which can be used to support disk 16. A pair of support rods 45 and 46 similar to the support rods 24, 25 and 26 of FIGS. 3 and 4 illustrate this support structure. Rod 45 has support arms 47 and 48 extending therefrom positioned on each side of disk 16. Support rod 46 has support arms 50 and 51 extending on each side of disk 16 in a manner similar to support arms 47 and 48. A support wire 53 fastened between support arms 47 and 48 extends through disk 16 at the nodal circle 20 and support wire 54 extends from support arm 50 to support arm 51 through disk 16 at the nodal circle 20. Support wires 53 and 54 are mechanically connected to disk 16 and the support arms to hold disk 16 at its nodal circle so that it can vibrate at its simplest mode of vibration.

The vibrating device described can be made temperature-insensitive by constructing disk 16 of a material which does not change its size with changes in temperature. An example of an alloy which has proven useful is:

| | |
|---|---|
| Ni | 35% |
| Co | 19% |
| Fe | 42.4% |
| Ti | 1% |
| Cb + Ta | 2.6% |

The embodiments of the invention in which an exclusive property or privilege is claimed are defined as follows:

1. Apparatus for measuring the density of a fluid, including in combination, a container for holding the fluid, a measuring device positioned within the container and including a thin circular disk completely submerged in the fluid, said disk having a plurality of resonant modes of vibration including a simplest mode of vibration and a nodal circle associated therewith, said measuring device further including a base, three support rods equally spaced about said disk, each of said support rods having a pair of arms extending therefrom with one of said pair of arms extending on one side of said disk and the other of said pair of arms extending on the other side of said disk, each of said arms having a point contact extending toward said disk with said point contacts in opposing relationship, each of said opposing point contacts being positioned against said disk at said nodal circle to support said disk therebetween, driving means positioned adjacent said disk to provide a driving force to cause said disk to vibrate at the resonant frequency of said simplest mode of vibration, said driving means including a central rod positioned on said base and extending to the center of said disk and a coil positioned around said central rod for providing a magneto-motive force for said driving force, and signal generator means coupled to said coil for providing an alternating current of a desired frequency thereto to develop said magneto-motive force.

* * * * *